(12) United States Patent
Galvano

(10) Patent No.: US 7,583,111 B2
(45) Date of Patent: Sep. 1, 2009

(54) METHOD FOR DRIVING A TRANSISTOR HALF-BRIDGE

(75) Inventor: Maurizio Galvano, Raffadali (IT)

(73) Assignee: Infineon Technologies AG, Neubiberg (DE)

( * ) Notice: Subject to any disclaimer, the term of this patent is extended or adjusted under 35 U.S.C. 154(b) by 166 days.

(21) Appl. No.: 11/825,323

(22) Filed: Jul. 5, 2007

(65) Prior Publication Data

US 2008/0246518 A1 Oct. 9, 2008

(30) Foreign Application Priority Data

Jul. 4, 2006 (EP) .................... 06 013 878.1-1242

(51) Int. Cl.
*H03B 1/00* (2006.01)
(52) U.S. Cl. ...................... 327/112; 327/110
(58) Field of Classification Search ......... 327/108–112, 327/427
See application file for complete search history.

(56) References Cited

U.S. PATENT DOCUMENTS

| | | | |
|---|---|---|---|
| 4,910,416 A * | 3/1990 | Salcone | 327/374 |
| 5,408,150 A * | 4/1995 | Wilcox | 327/108 |
| 5,777,496 A * | 7/1998 | Herman | 327/108 |
| 6,396,250 B1 * | 5/2002 | Bridge | 323/283 |
| 6,822,399 B2 | 11/2004 | Feldtkeller et al. | |
| 7,301,376 B2 * | 11/2007 | Capodivacca et al. | 327/112 |
| 2005/0110475 A1 | 5/2005 | Chapuis | |

FOREIGN PATENT DOCUMENTS

EP    1 422 813 A2    5/2004
WO    WO 2004/051851 A1    6/2004

OTHER PUBLICATIONS

Mills, C.J. "Digital Dead-Time Generator." *Electronic Design*. No. 44. Jan. 8, 1996. Cleveland, OH. pp. 119-120. (2 Pages).

* cited by examiner

*Primary Examiner*—Lincoln Donovan
*Assistant Examiner*—Hai L. Nguyen
(74) *Attorney, Agent, or Firm*—Maginot, Moore & Beck

(57) ABSTRACT

A method drives a transistor half-bridge. The method includes measuring a delay time between an edge of an input signal and an corresponding edge of a phase signal, and saving the delay time as a saved delay time value. The phase signal is the output of the transistor half-bridge. In the method, the following steps are repeated until the saved delay time value differs from the delay time by more than a given threshold:
decrementing the delay-value of a programmable delay circuit and the saved delay time value by a given decrement, the programmable delay circuit coupled to a control terminal of a first transistor of the half-bridge, and measuring the delay time between an edge of the input signal and an corresponding edge of the phase signal.

10 Claims, 4 Drawing Sheets

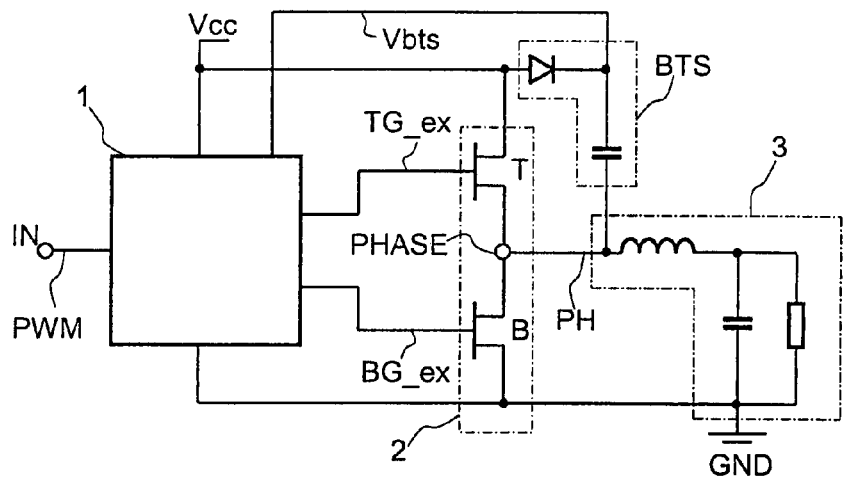
Fig. 1a   (conventional control circuit with half-bridge)
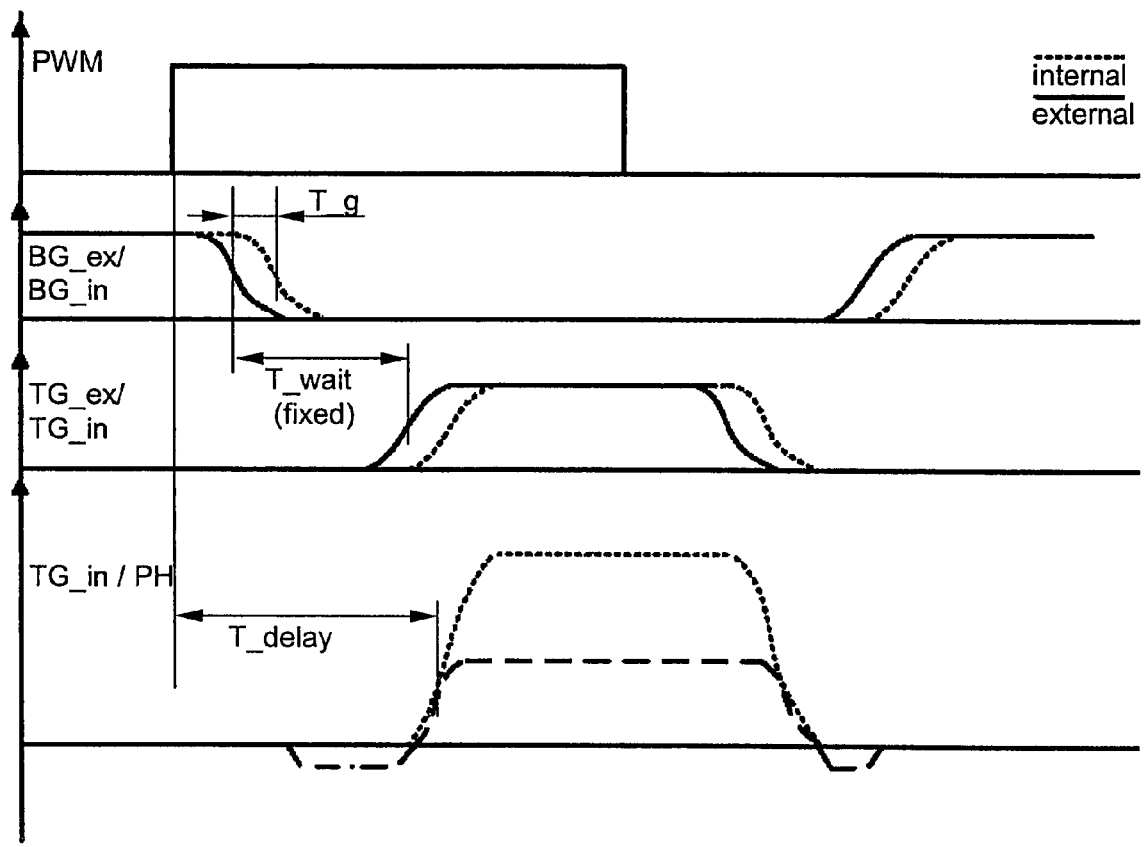
Fig. 1b   (timing diagramm for conventional control circuit)

METHOD FOR DRIVING A TRANSISTOR HALF-BRIDGE

TECHNICAL FIELD

The invention relates to a method and a corresponding circuit arrangement for driving a transistor half-bridge. Such half-bridges are commonly applied in switching regulators.

BACKGROUND

The half-bridge circuit shown in FIG. 1A has two n-channel MOS-transistors T and B, whose drain-source-paths are connected to form a series circuit. This series circuit is connected to a supply voltage Vcc and to a reference potential GND. A control circuit 1 is provided for driving the MOS-transistors B and T. The control circuit 1 is connected to the gate terminals TG and BG of the MOS-transistors T and B, to the supply voltage Vcc, as well as to the reference potential GND for supply purposes. A bootstrap supply-circuit provides a bootstrap supply-voltage Vbts to the control circuit 1 in order to enable the control circuit 1 to generate a control-signal TG_ex with a potential high enough to drive the gate of the top MOS-transistor T of the half-bridge 2 which operates as a high side switch. The junction between the top MOS-transistor T and the bottom (i.e. the low-side) MOS-transistor B forms a phase-terminal PHASE which a complex impedance load circuit 3 is connected to. The bootstrap supply circuit BTS, as well as the load circuit 3 are not important for the following considerations and are not explained in further detail.

The control-signals TG_ex and BG_ex provided by the control circuit 1 and received by the gate-terminals TG, BG of the top transistor T and the bottom MOS-transistor B respectively are driven dependent on the input-signal PWM received by the input-terminal IN of the control circuit 1.

The internal logic of the control circuit 1 ensures a proper switching of the half-bridge 2.

FIG. 1b shows an exemplary timing diagram of the input-signal PWM, the control-signals BG_ex and TG_ex and the phase-signal PH which can be regarded as an output signal of the half-bridge. As can be seen from FIG. 1b the phase-signal PH merely follows the input-signal PWM. A rising edge in the input-signal PWM is followed by a rising edge in the phase-signal PH after a delay time T_delay. In order to switch the phase-signal from a low into a high state, after a rising edge in the input-signal PWM, the bottom (low-side) transistor B has to be switched off and then the top (high-side) transistor T has to be switched on.

The phase-signal PH will go to a high state not earlier than a low resistance channel has formed in the gate region of the top transistor T. The forming of a low resistance channel in a MOS-transistor happens a short delay time T_g after the control-signal applied to the gate terminal of the transistor has switched to a high state. This delay time T_g corresponds to a delay time of a low-pass formed of the bonding resistance and the gate-source-capacitance of each MOS-transistor. For this reason one has to distinguish between an external control-signal (e.g. TG_ex, BG_ex) applied to an external gate terminal of a transistor and an "internal" control-signal (e.g. TG_in, BG_in) representing the actual gate voltage on the chip.

The aforementioned delay time T_delay is mainly determined by the delays of the internal switching logic and the delay time T_g between the external control-signal TG_ex, BG_ex and the internal control-signal TG_in, BG_in. In order to ensure an optimal switching process the time T_wait between a falling edge of the signal BG_ex controlling the gate of the bottom transistor B and a rising edge of the signal TG_ex controlling the gate of the top transistor T should be minimized.

But the delay time T_wait can not be set arbitrarily small. If the external control-signal TG_ex of the top transistor T would be switched to a high level immediately after the control-signal BG_ex of the bottom transistor was switched to a low level the internal control-signals TG_in and BG_in would overlap and an unwanted cross-conduction between the top transistor T and the bottom transistor B would occur. Cross-conduction implicates a large power dissipation which can lead to a thermal destruction of the half-bridge.

To avoid these adverse effects of cross-conduction conventional driver circuits guarantee a fixed delay T_wait between two corresponding edges of the control-signal BG_ex and TG_ex, such that the corresponding internal control-signals TG_in and BG_in will not overlap and cross-conduction is inhibited. Since the delay T_g between the internal and the external control-signals can vary with temperature the fixed delay time T_wait could be too high or too small for operation in certain temperature ranges. This problem is usually solved by employing sensing means for sensing the cross-conduction current and adapting the delay time T_wait between an edge of the control-signal BG_ex and a corresponding edge of the control-signal TG_ex, such that cross conduction is reduced to a minimum. This conventional solution has the disadvantage, that additional sensing means for sensing the cross-conduction current and an additional input pin for the control circuit is necessary.

SUMMARY

A control circuit according to an example of the invention comprises a half-bridge and a control circuit for driving the half-bridge. The half-bridge comprises a first transistor having a first load-terminal, a second load-terminal and a control-terminal receiving a first control-signal from the control circuit, a second transistor having a first load-terminal, a second load-terminal and a control-terminal receiving a second control-signal from the control circuit. The second load-terminal of the first transistor and the first load-terminal of the second transistor both are connected to a phase-terminal providing a phase-signal. Such interconnected the two transistors form a half-bridge connected between a supply voltage and a reference potential with a complex impedance load circuit connected to the common junction, i.e. the phase-terminal, of the two transistors.

The control circuit mentioned above comprises an input-terminal receiving an input-signal from an external source, a feedback terminal connected to the phase-terminal of the half-bridge, a first and a second output-terminal connected to the control-terminal of the first transistor and of the second transistor respectively. The control circuit further comprises a driver circuit adapted for providing the control-signals received by the control-terminals of the transistors of the half-bridge and a programmable delay circuit connected between the input-terminal and one of the output-terminals. The control circuit further comprises a processing circuit adapted for dynamically adjusting the delay of the programmable delay circuit, such to achieve an optimal switching operation.

The function and the construction of the processing circuit will be explained in more detail below. Of course the inventive control circuit is supplied by a bootstrap supply circuit in order to be able to generate the necessary voltage levels for controlling the gate of the first (high side) transistor.

According to an example of the inventive method
(A) a time delay between an edge of the input-signal and a corresponding edge of the phase-signal is measured.
(B) Then the measured delay time is saved and
(C) the saved delay time value is decremented by a fixed time interval (e.g. 3-5 ns). The delay value of the programmable delay circuit is decremented as well by the same fixed time interval.
(D) In a next step the delay time between an edge of the input-signal and a corresponding edge of the phase-signal is measured again. This measured delay time should now be equal to the saved delay time value, that is equal to the delay time measured before (in step A) minus the above-mentioned decrement.
(E) The measured actual delay time is then compared to the saved delay time value, and if the measured delay time actually is equal to the saved delay time value or at least does not differ from the saved delay time value by more than a given threshold, the steps C to E are repeated until the saved delay time value is smaller than the actual measured delay time or at least differs from the actual measured delay time by more than the given threshold.

This stop criterion for the iteration guarantees a minimal delay time which is necessary to avoid cross conduction in the half-bridge.

A similar effect is achieved with a slight modification of the afore-mentioned method. According to such modification:
(A) a time delay between an edge of the input-signal and a corresponding edge of the phase-signal is measured.
(B) Then the measured delay time is saved and
(C) the saved delay time value is decremented by a fixed time interval. The delay value of the programmable delay circuit is decremented as well by the same fixed time interval.
(D) In the next step a time shifted signal is provided which is a time shifted version of the input-signal shifted by the saved delay time value.
(E) Then the time difference between an edge of the time shifted signal and the phase-signal is measured.
(F) If the time shifted signal is "faster" than the phase signal a optimal, i.e. a minimal, delay time has been achieved. If not the steps C to F are repeated until the time difference exceeds a certain threshold, i.e. the shifted signal is faster than the phase signal.

According to this modified method only the time difference between a time shifted signal and the phase-signal is measured in the iteration loop. The iteration is stopped if the time shifted signal is faster than the phase signal, i.e. an edge in the time shifted signal occurs before a corresponding edge in the phase-signal. Since an exact simultaneity can not be measured, corresponding edges are regarded as "simultaneous" if the time difference between the two edges is below a certain threshold.

As mentioned above the circuit arrangement comprises a half-bridge and a control circuit comprising a driving circuit and a processing circuit. The driving circuit comprises logic circuits and the programmable delay circuit connected between the input terminal and one of the output terminals. It (the driving circuit) generates the control-signals for controlling the gates of the half-bridge, wherein the control-signals depend on the input-signal.

The processing circuit comprises means for performing the above-mentioned method. To be more precise it comprises measuring means adapted for measuring a delay time between an edge of the input-signal and a corresponding edge of the phase-signal. It further comprises means adapted for saving the measured delay time and adapted for decrementing the saved delay time value and the delay value of the above-mentioned programmable delay circuit. The processing circuit further comprises comparing means adapted for comparing an actual measured delay time with a saved delay time value.

To perform the above-mentioned modified version of the method the comparing means comprise a reference driver, which e.g. can be a delay line which provides a time shifted version of the input-signal dependent on the saved delay time value, and a speed comparator which is adapted for measuring the difference between an edge of the time shifted signal and a corresponding edge of the phase-signal and which is adapted for deciding which of the signals is "faster".

BRIEF DESCRIPTION OF THE DRAWINGS

Examples of the invention are explained in more detail based on figures.

FIG. 1a shows a conventional control circuit with half-bridge.

FIG. 1b shows a timing diagram for a conventional control circuit.

In the figures, unless otherwise indicated, the same reference notations refer to the same components and the signals with the same meaning.

DETAILED DESCRIPTION

Figure 2:
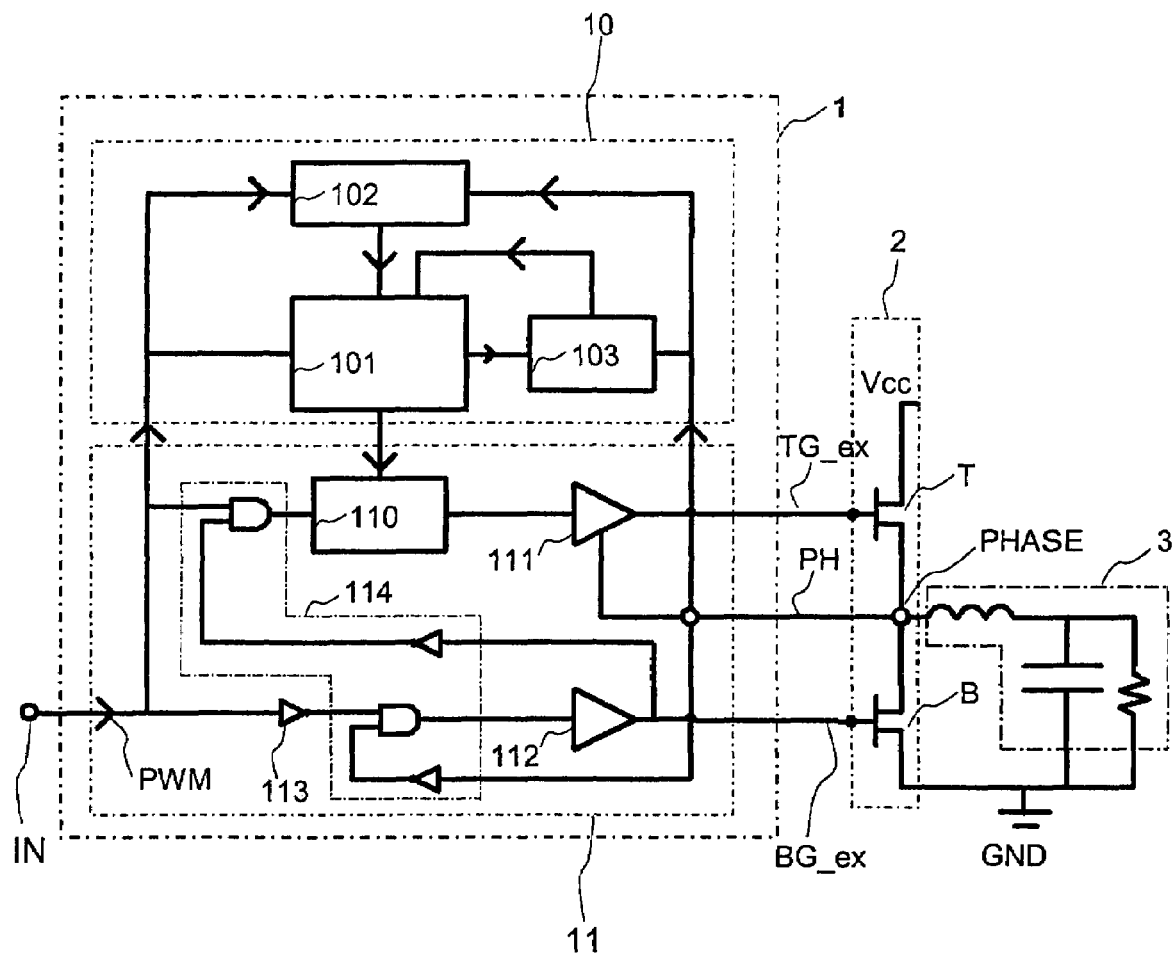
FIG. 2 shows the inventive circuit arrangement comprising a half-bridge, a control circuit which comprises a driving circuit and a processing circuit, and a load circuit.

FIG. 2 shows a block diagram of a circuit arrangement according to an example of the invention. The half-bridge 2 has two n-channel MOS-transistors, the top (high-side) transistor T and the bottom (low-side) transistor B, whose drain-source-paths are interconnected at a phase terminal PHASE to form a series circuit. This series circuit, i.e. the half-bridge 2, is connected to a supply voltage Vcc and to a reference potential GND. The phase terminal PHASE can be regarded as the "output", a first control terminal TG and a second control terminal BG (reference notations not shown in the diagram) can be regarded as "inputs" of the half-bridge 2.

A complex impedance load circuit 3 is connected between the phase terminal PHASE and the reference potential GND. The load circuit 3 is driven by the half-bridge 3 and not important for further considerations and therefore not explained in more detail.

A control circuit 1 is provided for driving the MOS-transistors B and T. The control circuit 1 is connected to the gates of the MOS-transistors T and B, i.e. to the first control-terminal TG and the second control-terminal BG, and the control circuit 1 provides a first control signal TG_ex and a second control signal BG_ex to the control-terminals TG and BG of the half-bridge 2. The control circuit further comprises an input-terminal IN receiving an input-signal PWM and a feedback terminal connected to the phase-terminal PHASE of the half-bridge 2.

The control circuit 1 comprises a processing circuit 10 and a driving circuit 11. The driving circuit 11 comprises a driver 111 for the top transistor T and a driver 112 for the bottom transistor B, further a programmable delay circuit 110 connected between the input-terminal IN and the driver 111 for the top transistor T, and logic circuits 114 connecting the input terminal IN with the drivers 111 and 112. The logic circuits 114 mainly prevent invalid switching states (e.g. both transistors on) of the half-bridge and is not important for further considerations and is not explained in more detail. An inverter 113 is connected into the path between the input terminal IN and the driver 112 for the bottom transistor B, such that if the input-signal IN goes high, as a consequence the driver 112 for the bottom transistor B switches to a low level and the driver 111 for the top transistor T switches to a high level.

The processing circuit 10 receives the input-signal PWM from the input-terminal IN and a phase signal PH from the feedback terminal and it controls a delay value T_d of the programmable delay circuit 110. The "internals" of the processing circuit comprise measuring means 102 receiving the input-signal PWM and the phase signal PH, a reference driver 101, and a comparing means 103.

The measuring means 102 is adapted for measuring the delay time T_delay between an edge of the input-signal IN and a corresponding edge of the phase signal PH, i.e. it measures the response time of the phase-signal PH. The measured value for the delay time T_delay can be transferred to the reference driver 101 which also receives the input-signal IN and provides a time-shifted version thereof, i.e. a time-shifted signal PH_ref. This time-shifted signal is delayed by a saved delay time value T_delay' with respect to the input-signal PWM. Furthermore the reference driver 101 is adapted for saving the delay time T_delay measured before and adapted for modifying the saved delay time value T_delay' and the delay value T_d of the programmable delay circuit 110.

The comparing means 103 receives the phase signal PH and the time-shifted signal PH_ref. It is adapted for checking whether the time-shifted signal PH_ref is "faster" than the phase signal PH. In other words it measures the time difference T_diff between the time-shifted signal PH_ref and the phase signal PH. The result of the comparison is provided to the reference driver 101.

Figure 3:
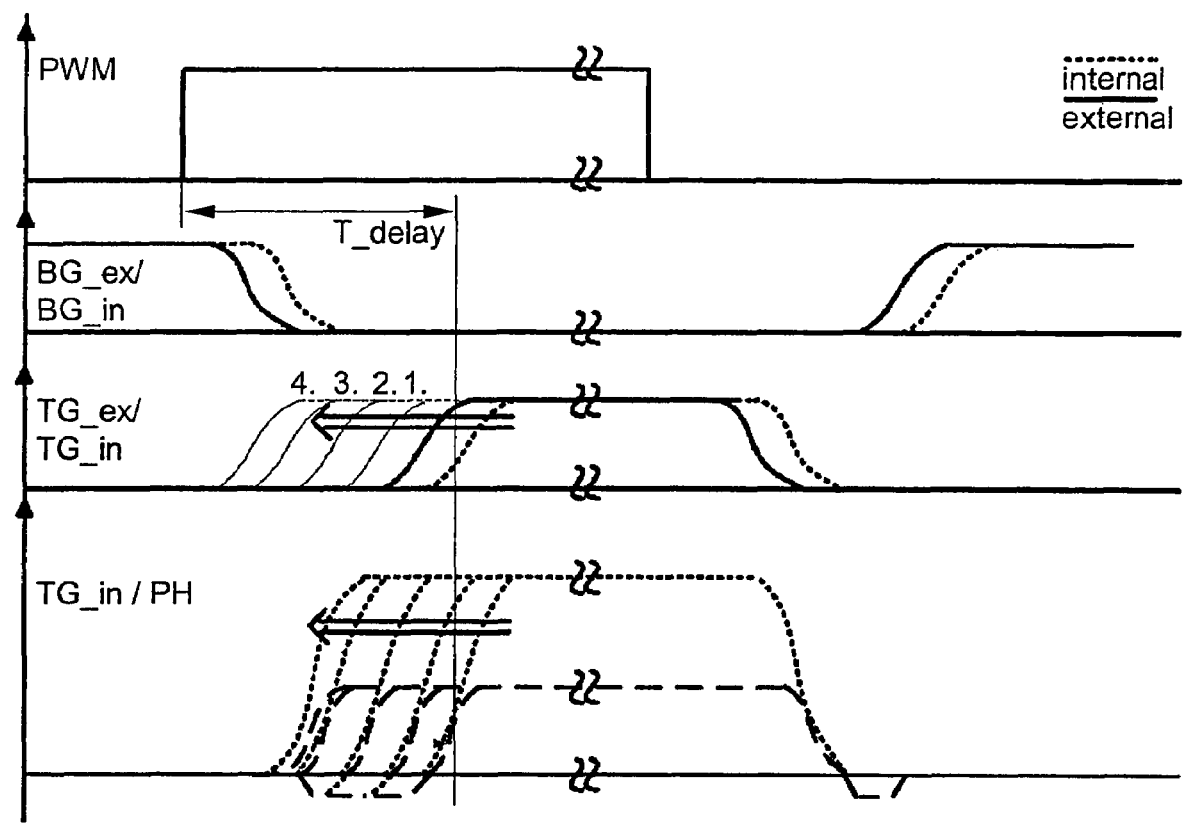
FIG. 3 shows a timing diagram corresponding to the inventive control circuit.
Figure 4:
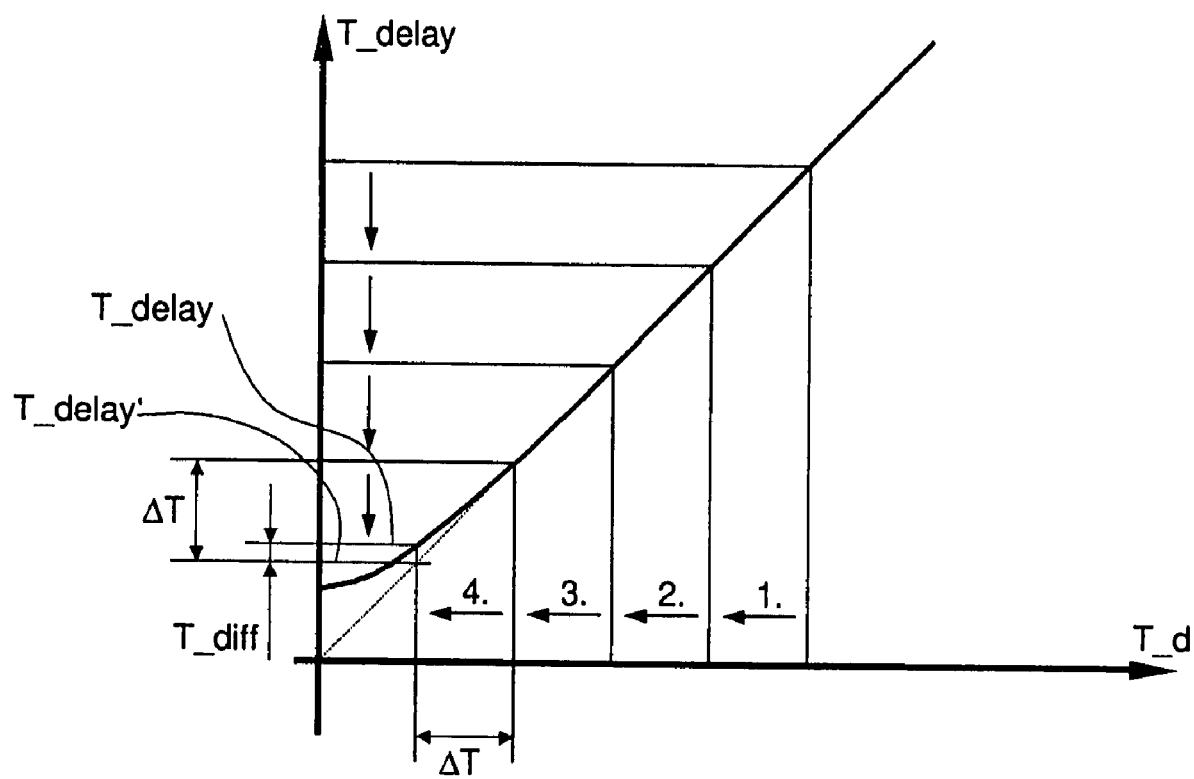
FIG. 4 illustrates the iterative approach to an optimal, i.e. minimal, delay value like it is performed by the inventive method.

FIGS. 3 and 4 illustrate an example of an inventive method for driving the half-bridge 2 as performed by the control circuit 1 described above. FIG. 3 shows a timing diagram for the input-signal PWM, the "external" first control-signal TG_ex and the "external" second control-signal BG_ex, the corresponding "internal" control-signals TG_IN and BG_in (dashed lines), and the phase-signal PH. The relation between the internal and the external control-signals has been discussed above.

In the following discussion a rising edge of the input-signal PWM is considered. The rising edge is transformed to a falling edge by the inverter 113, and the falling edge is transported to the gate-terminal BG of the bottom transistor B via the logic circuits 114 and the driver 112, such that a rising edge in the input-signal PWM is followed by a falling edge of the control signals BG_ex and BG_in respectively turning off the gate of the bottom transistor B. The rising edge of the input-signal PWM is also transported to the gate-terminal TG of the top transistor T via the logic circuits 114, the programmable delay circuit 110, and the driver 111. The delay value of the programmable delay circuit 110 should be set sufficiently large, such that the internal control signals TG_in and BG_in do not overlap and cross-conduction is avoided. A rising edge of the internal first control-signal TG_in is immediately followed by a rising edge in the phase-signal.

Starting from an initial delay value the inventive method for driving a half-bridge iteratively decrements the delay value T_d of the programmable delay circuit 110 until an optimal delay value is reached. The optimal delay value is the minimal delay value T_d with no cross-conduction occurring. The performed steps are as follows.

(A) In a first step the delay time T_delay between the input-signal PWM and the corresponding phase-signal PH is measured by the measuring means 102 and (B) the measured delay time T_delay is received and saved by the reference driver 101 as a saved delay time value T_delay'.

The iteration loop starts here:

(C) The saved delay time value T_delay' and the delay value T_d of the programmable delay circuit 110 are decremented by a certain time interval ΔT. A reduced delay value T_d will result in a reduced delay time T_delay between the next rising edge of the input-signal PWM and the corresponding edge of the phase signal PH. In other words, the next edge of the phase signal PH should come a time ΔT earlier with respect to the corresponding edge of the input-signal PWM. This effect can also be seen in FIG. 4.

(D) In a next step the reference driver 101 generates a time-shifted signal PH_ref shifted by the saved delay time T_delay' with respect to the input-signal PWM. The time-shifted signal PH_ref is a sort of "expected" phase-signal.

(E) In the last step of the iteration the comparing means 103 checks, whether the time-shifted signal PH_ref or the "real" phase signal PH is "faster", i.e. a time-difference T_diff between two corresponding edges of the signals exceeds a certain threshold. If this is the case, an optimal delay value T_d has been reached, if not, the next iteration loop is started beginning with step C.

This stop criterion is also illustrated in FIG. 4. A reduction of the delay value T_d is accompanied with a reduction of the delay time T_delay between the input-signal PWM and the phase-signal PH (cf. iteration numbers 1 to 3 in FIG. 4), as long as the delay time T_delay can not be reduced any more (cf. iteration number 4 in FIG. 4). If this is the case the time-shifted signal PH_ref (which represents the ideal case indicated with the dotted line) will be faster than the phase-signal PH and the iteration is stopped.

The time intervals ΔT has not necessarily always the same length. In a modified version of the inventive method the delay value T_d is decremented by a time interval ΔT, whose length is dynamically adjustable, e.g. such that the time interval ΔT shrinks from one iteration to the next to achieve an optimal delay time.

The invention claimed is:

1. A method for driving a transistor half-bridge comprising
   (A) measuring a delay time between an edge of an input signal and an corresponding edge of a phase signal, the phase signal comprising the output signal of the transistor half-bridge,
   (B) saving said delay time to generate a saved delay time value,
   (C) decrementing said delay value of a programmable delay circuit and said saved delay time value by a given decrement, the programmable delay disposed between the a node containing the input signal and a control terminal of a first transistor of the transistor half-bridge,
   (D) measuring said delay time between an edge of said input signal and an corresponding edge of said phase signal,
   (E) repeating steps C to E until said saved delay time value differs from said delay time by more than a given threshold.

2. The method as claimed in claim 1, wherein the output signal of the transistor half-bridge comprises a signal at a junction between the first transistor and a second transistor of the transistor half-bridge.

3. The method as claimed in claim 1, wherein the junction comprises a connection between load terminals of the first and second transistor.

4. The method as claimed in claim 1, wherein said time interval is set smaller each time before step C is repeated.

5. A method for driving a transistor half-bridge, comprising:
   (A) measuring a delay time between an edge of an input signal and a corresponding edge of a phase signal, the phase signal comprising the output signal of the transistor half-bridge,
   (B) saving said delay time in order to generate a saved delay time value,
   (C) decrementing said delay value of a programmable delay circuit and said saved delay time value by a given decrement, the programmable delay disposed between the a node containing the input signal and a control terminal of a first transistor of the transistor half-bridge,
   (D) providing a time-shifted signal which is a time-shifted version of said input-signal shifted by said saved delay time value,
   (E) measuring the time difference between an edge in said time-shifted signal and said phase signal,
   (F) repeating steps C to F until said time-difference exceeds a certain threshold.

6. The method as claimed in claim 5, wherein the output signal of the transistor half-bridge comprises a signal at a junction between the first transistor and a second transistor of the transistor half-bridge.

7. The method as claimed in claim 5, wherein the junction comprises a connection between load terminals of the first and second transistor.

8. The method as claimed in claim 5, wherein said time interval is set smaller each time before step C is repeated.

9. A circuit arrangement comprising:
   a half bridge comprising
      a first transistor having a first load terminal, a second load-terminal, and a control terminal receiving a first control-signal,
      a second transistor having a first load terminal, a second load terminal, and a control terminal receiving a second control signal, wherein
      said second load terminal of said first transistor and said first load terminal of said second transistor both are connected to a phase terminal providing a phase signal; and
   a control circuit comprising
      a feedback terminal connected to said phase terminal,
      a driver circuit adapted for providing said first and second control signals and comprising a programmable delay circuit operably connected to said control terminal of said first transistor,
      a processing circuit configured to
         measure a delay time between an edge of said input signal and an corresponding edge of said phase signal,
         save said delay time and decrementing a saved delay time and a delay value of said programmable delay circuit, and
         compare said delay time with a saved delay time value.

10. The circuit arrangement of claim 9, wherein said first and second transistors comprise MOS transistors.

* * * * *